(12) United States Patent
Zhu et al.

(10) Patent No.: US 11,395,164 B2
(45) Date of Patent: Jul. 19, 2022

(54) METHOD, APPARATUS AND COMPUTER-READABLE MEDIUM FOR TERMINAL MONITORING INFORMATION SYNCHRONIZATION

(71) Applicant: HUAWEI TECHNOLOGIES CO., LTD., Shenzhen (CN)

(72) Inventors: Hualin Zhu, Shanghai (CN); Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 16/656,225

(22) Filed: Oct. 17, 2019

(65) Prior Publication Data

US 2020/0053582 A1 Feb. 13, 2020

Related U.S. Application Data

(63) Continuation of application No. PCT/CN2017/080964, filed on Apr. 18, 2017.

(51) Int. Cl.
*H04L 12/26* (2006.01)
*H04W 24/08* (2009.01)
(Continued)

(52) U.S. Cl.
CPC ............ *H04W 24/08* (2013.01); *H04W 24/10* (2013.01); *H04W 36/14* (2013.01); *H04W 88/02* (2013.01)

(58) Field of Classification Search
CPC .................................................... H04W 24/08
(Continued)

(56) References Cited

U.S. PATENT DOCUMENTS 9,826,443 B2 * 11/2017 Shaheen ........... H04W 36/0022
10,582,424 B2 * 3/2020 Lu ..................... H04W 36/0022
(Continued)

FOREIGN PATENT DOCUMENTS

CN 101047974 A 10/2007
CN 101841869 A 9/2010
(Continued)

OTHER PUBLICATIONS

Office Action dated Feb. 6, 2020 from corresponding application No. CN 201780061299.3.
(Continued)

*Primary Examiner* — Thai D Hoang
(74) *Attorney, Agent, or Firm* — Hauptman Ham, LLP

(57) ABSTRACT

A method includes processing, by an information sharing network element executed by a processor, a monitoring request received from a content server to determine whether a handed-over-to network supports monitoring information included in the monitoring request. The monitoring information is associated with a terminal that is in one of a first network or a second network and is handed over to the other of the first network or the second network. The method also includes sending, by the information sharing network element, the monitoring information to a mobility management network element in a handed-over-to network based on a determination that the handed-over-to network supports the monitoring information. The monitoring information includes data associated with the terminal in a handed-over-from network.

16 Claims, 12 Drawing Sheets

(51) Int. Cl.
*H04W 24/10* (2009.01)
*H04W 36/14* (2009.01)
*H04W 88/02* (2009.01)

(58) Field of Classification Search
USPC .................................. 370/229–236, 335–345
See application file for complete search history.

(56) References Cited

U.S. PATENT DOCUMENTS

| | | | |
|---|---|---|---|
| 2004/0176094 A1* | 9/2004 | Kim | H04W 36/0033 455/438 |
| 2004/0185853 A1* | 9/2004 | Kim | H04W 36/0085 455/438 |
| 2005/0250498 A1* | 11/2005 | Lim | H04W 36/26 455/436 |
| 2006/0079235 A1* | 4/2006 | Kim | H04W 36/12 455/439 |
| 2007/0104148 A1* | 5/2007 | Kang | H04W 36/04 370/331 |
| 2009/0005048 A1* | 1/2009 | Bae | H04L 12/4633 455/439 |
| 2009/0274302 A1* | 11/2009 | Wu | H04W 12/062 380/272 |
| 2011/0170517 A1* | 7/2011 | Bakker | H04W 36/125 370/331 |
| 2012/0026976 A1* | 2/2012 | Chang | H04L 5/0037 370/331 |
| 2012/0057569 A1* | 3/2012 | Xie | H04W 36/0022 370/331 |
| 2012/0294173 A1 | 11/2012 | Su et al. | |
| 2014/0134996 A1 | 5/2014 | Barclay et al. | |
| 2014/0185586 A1* | 7/2014 | Wu | H04W 36/0022 370/331 |
| 2014/0355430 A1 | 12/2014 | Smith et al. | |
| 2014/0376377 A1 | 12/2014 | Mikoda et al. | |
| 2015/0098323 A1* | 4/2015 | Lim | H04W 28/0268 370/230 |
| 2015/0305009 A1 | 10/2015 | Smith et al. | |
| 2015/0327143 A1* | 11/2015 | Won | H04W 24/10 370/332 |
| 2015/0341835 A1 | 11/2015 | Bontu et al. | |
| 2015/0358865 A1* | 12/2015 | Fu | H04W 36/0058 455/436 |
| 2016/0242090 A1* | 8/2016 | Chen | H04W 36/28 |
| 2016/0277243 A1 | 9/2016 | Kim et al. | |
| 2016/0337841 A1 | 11/2016 | Won et al. | |
| 2016/0360453 A1 | 12/2016 | Klein et al. | |
| 2017/0048770 A1 | 2/2017 | Somasundaram et al. | |
| 2017/0311208 A1* | 10/2017 | Yu | H04W 36/0058 |
| 2019/0357025 A1* | 11/2019 | Hwang | H04L 5/001 |
| 2019/0357103 A1* | 11/2019 | Jin | H04W 24/10 |
| 2020/0078909 A1* | 3/2020 | Park | B25B 23/103 |
| 2020/0120548 A1* | 4/2020 | Jin | H04W 60/04 |

FOREIGN PATENT DOCUMENTS

| | | |
|---|---|---|
| CN | 102421132 A | 4/2012 |
| CN | 102883342 A | 1/2013 |
| CN | 202889646 U | 4/2013 |
| CN | 103999500 A | 8/2014 |
| CN | 104125596 A | 10/2014 |
| CN | 104219645 A | 12/2014 |
| CN | 104640126 A | 5/2015 |
| CN | 104798395 A | 7/2015 |
| CN | 104869595 A | 8/2015 |
| EP | 3104646 A1 | 12/2016 |
| WO | 2016004599 A1 | 1/2016 |
| WO | 2017044015 A1 | 3/2017 |

OTHER PUBLICATIONS

Second Chinese Office Action issued in corresponding Chinese Application No. 201780061299.3, dated Sep. 22, 2020, The State Intellectual Property Office of People's Republic of China, Beijing, China.

3GPP TS 27.007 V14.3.0 (Mar. 2017),3rd Generation Partnership Project;Technical Specification Group Core Network and Terminals;AT command set for User Equipment (UE)(Release 14),total 346 pages.

3GPP TS 23.682 V15.0.0 (Mar. 2017),3rd Generation Partnership Project;Technical Specification Group Services and System Aspects;Architecture enhancements to facilitate communicationswith packet data networks and applications (Release 15),total 108 pages.

The extended European search report dated Dec. 13, 2019 from corresponding application No. EP 17906694.9.

International search report dated Jan. 16, 2018 from corresponding application No. PCT/CN2017/080964.

Nemeth Balazs et al., The limits of architectural abstraction in network function virtualization 2015 IFIP/IEEE International Symposium on Integrated Network Management (IM), Jul. 2, 2015, 7 pages.

Wang Qinmin et al., Protection Mechanism of MPLS Based on Link Monitoring. Computer Engineering, vol. 32, No. Jun. 11, 2006, 3 pages.

Chinese Notice of Allowance issued in corresponding Chinese Application No. 201780061299.3, dated Aug. 5, 2021, pp. 1-5.

* cited by examiner

METHOD, APPARATUS AND COMPUTER-READABLE MEDIUM FOR TERMINAL MONITORING INFORMATION SYNCHRONIZATION

CROSS-REFERENCE TO RELATED APPLICATION

This application is a continuation of International Application No. PCT/CN2017/080964, filed on Apr. 18, 2017, the disclosure of which is hereby incorporated by reference in its entirety.

TECHNICAL FIELD

This disclosure relates to the field of communications technologies, and in particular, to a terminal monitoring information synchronization method, device, and system.

BACKGROUND

As the communications technologies develop, an increasing quantity of network requirements arise. To meet a particular network requirement, corresponding requirement information usually needs to be configured in a network. For example, to implement terminal monitoring, terminal monitoring information may be configured in the network. The terminal monitoring information is used to monitor a status of a terminal, for example, to monitor whether the terminal is online or offline.

Currently, configuration of terminal monitoring information is usually for a single network; in other words, terminal monitoring information is configured in a single network. However, when a terminal is handed over from one network to another, terminal monitoring information cannot be transmitted from one network to another. As a result, terminal monitoring cannot be kept continuous.

SUMMARY

Embodiments of this disclosure provide a terminal monitoring information synchronization method, device, and system, so that terminal monitoring can be kept continuous when a network handover occurs.

To achieve the foregoing objective, the following technical solutions are used in the embodiments of this disclosure.

According to a first aspect, a terminal monitoring information synchronization method is provided, and the method includes: receiving, by an information sharing network element, a monitoring request from a content server, where the monitoring request includes monitoring information of the terminal; when the terminal is handed over between a first network and a second network, determining, by the information sharing network element, that a handed-over-to network supports the monitoring information; and sending, by the information sharing network element, the monitoring information to a mobility management network element in the handed-over-to network, where the monitoring information is monitoring information of the terminal in a handed-over-from network. According to this terminal monitoring information synchronization method, the information sharing network element can receive, from the content server, the monitoring request including the monitoring information of the terminal in the handed-over-from network, and send the monitoring information to the mobility management network element in the handed-over-to network when determining that the handed-over-to network supports the monitoring information. Therefore, when a network handover occurs, the mobility management network element in the handed-over-to network can keep terminal monitoring continuous based on the monitoring information.

In a possible design, after the receiving, by an information sharing network element, a monitoring request from a content server, the method further includes: storing, by the information sharing network element, the monitoring information. In this way, when the network handover occurs, the information sharing network element can send the monitoring information to the mobility management network element in the handed-over-to network when determining that the handed-over-to network supports the monitoring information. Therefore, when the network handover occurs, the mobility management network element in the handed-over-to network can keep terminal monitoring continuous based on the monitoring information.

In a possible design, the monitoring request further includes identification information of the terminal; and the storing, by the information sharing network element, the monitoring information includes: determining, by the information sharing network element based on the identification information of the terminal, that the terminal subscribes to the handed-over-to network and the terminal can be handed over between the first network and the second network; and storing, by the information sharing network element, the monitoring information. According to this solution, storage resources of the information sharing network element can be saved, and unnecessary storage operations are avoided.

In a possible design, the first network is an unlicensed spectrum network, and the second network is a 3rd generation partnership project 3GPP network.

In a possible design, the monitoring information includes a monitoring type; and the determining, by the information sharing network element when the terminal is handed over between a first network and a second network, that a handed-over-to network supports the monitoring information includes: when the terminal is handed over from the first network to the second network, receiving, by the information sharing network element, monitoring type indication information of the second network from a mobility management network element in the second network, and determining, based on the monitoring type indication information of the second network, that the handed-over-to network supports the monitoring type. In other words, when the terminal is handed over from the unlicensed spectrum network to the 3GPP network, the information sharing network element may determine, based on the monitoring type indication information of the 3GPP network that is received from the mobility management network element in the 3GPP network, that the 3GPP network supports the monitoring type.

In a possible design, the monitoring information includes a monitoring type; and the determining, by the information sharing network element when the terminal is handed over between a first network and a second network, that a handed-over-to network supports the monitoring information includes: when the terminal is handed over from the second network to the first network, determining, by the information sharing network element, that the first network is capable of monitoring; and receiving, by the information sharing network element, monitoring type indication information of the first network from a mobility management network element in the first network, and determining, based on the monitoring type indication information of the first network, that the handed-over-to network supports the monitoring type. In other words, when the terminal is handed over from the 3GPP network to the unlicensed spectrum network, the information sharing network element first determines whether the unlicensed spectrum network is capable of monitoring; and when the unlicensed spectrum network is capable of monitoring, determines, based on the monitoring type indication information of the unlicensed spectrum network that is received from the mobility management network element in the unlicensed spectrum network, that the unlicensed spectrum network supports the monitoring type.

In a possible design, the determining, by the information sharing network element, that the first network is capable of monitoring includes: receiving, by the information sharing network element, monitoring capability indication information of the first network from the mobility management network element in the first network, and determining, based on the monitoring capability indication information, that the first network is capable of monitoring; or receiving, by the information sharing network element, identification information of the first network from the mobility management network element in the first network, and determining, based on the identification information, that the first network is capable of monitoring. According to this solution, the information sharing network element can determine that the first network is capable of monitoring.

In a possible design, the information sharing network element includes a home subscriber server HSS or a service capability exposure function SCEF network element or an authentication, authorization and accounting server AAA server.

In a possible design, the monitoring information further includes monitoring duration and/or a maximum report quantity.

According to a second aspect, a terminal monitoring information synchronization method is provided, and the method includes: when a terminal is handed over between a first network and a second network, receiving, by a mobility management network element in a handed-over-to network, monitoring information of the terminal in a handed-over-from network from an information sharing network element; and monitoring, by the mobility management network element, the terminal based on the monitoring information. According to the terminal monitoring information synchronization method, when the terminal is handed over between the first network and the second network, the mobility management network element in the handed-over-to network receives the monitoring information of the terminal in the handed-over-from network from the information sharing network element; and monitors the terminal based on the monitoring information. Therefore, when a network handover occurs, terminal monitoring can be kept continuous.

In a possible design, the information sharing network element includes a home subscriber server HSS or a service capability exposure function SCEF network element or an authentication, authorization and accounting server AAA server.

In a possible design, the monitoring information further includes monitoring duration and/or a maximum report quantity.

According to a third aspect, an embodiment of this disclosure provides an information sharing network element, and the information sharing network element has a function of implementing behaviors of the information sharing network element in the foregoing method embodiments. The function may be implemented by hardware, or may be implemented by hardware executing corresponding software. The hardware or software includes one or more modules corresponding to the function.

According to a fourth aspect, an embodiment of this disclosure provides an information sharing network element, and the information sharing network element includes a processor, a memory, a bus, and a communications interface. The memory is configured to store a computer executable instruction; the processor is connected to the memory by using the bus; and when the information sharing network element runs, the processor executes the computer executable instruction stored in the memory, so that the information sharing network element performs the terminal monitoring information synchronization method according to any one of the first aspect or the possible designs of the first aspect.

According to a fifth aspect, an embodiment of this disclosure provides a computer readable storage medium, configured to store a computer software instruction for use by the foregoing information sharing network element. When the instruction runs on a computer, the computer is enabled to perform the terminal monitoring information synchronization method according to any one of the first aspect or the possible designs of the first aspect.

According to a sixth aspect, an embodiment of this disclosure provides a computer program product including an instruction. When the computer program product runs on a computer, the computer is enabled to perform the terminal monitoring information synchronization method according to any one of the first aspect or the possible designs of the first aspect.

For technical effects brought by any design manner in the third to the sixth aspects, refer to the technical effects brought by different design manners in the first aspect, and details are not described herein again.

According to a seventh aspect, an embodiment of this disclosure provides a mobility management network element, and the mobility management network element has a function of implementing behaviors of the mobility management network element in the foregoing method embodiments. The function may be implemented by hardware, or may be implemented by hardware executing corresponding software. The hardware or software includes one or more modules corresponding to the function.

According to an eighth aspect, an embodiment of this disclosure provides a mobility management network element, and the mobility management network element includes a processor, a memory, a bus, and a communications interface. The memory is configured to store a computer executable instruction; the processor is connected to the memory by using the bus; and when the mobility management network element runs, the processor executes the computer executable instruction stored in the memory, so that the mobility management network element performs the terminal monitoring information synchronization method according to any one of the second aspect or the possible designs of the second aspect.

According to a ninth aspect, an embodiment of this disclosure provides a computer readable storage medium, configured to store a computer software instruction for use by the foregoing mobility management network element. When the instruction runs on a computer, the computer is enabled to perform the terminal monitoring information synchronization method according to any one of the second aspect or the possible designs of the second aspect.

According to a tenth aspect, an embodiment of this disclosure provides a computer program product including an instruction. When the computer program product runs on a computer, the computer is enabled to perform the terminal monitoring information synchronization method according to any one of the second aspect or the possible designs of the second aspect.

For technical effects brought by any design manner in the seventh to the tenth aspects, refer to the technical effects brought by different design manners in the first aspect, and details are not described herein again.

According to an eleventh aspect, an embodiment of this disclosure provides a terminal monitoring information synchronization system, and the synchronization system includes the information sharing network element according to any one of the foregoing aspects and the mobility management network element according to any one of the foregoing aspects.

These or other aspects of this disclosure are more concise and comprehensible in descriptions of the following embodiments.

DESCRIPTION OF EMBODIMENTS

The following describes technical solutions in the embodiments of this disclosure with reference to accompanying drawings in the embodiments of this disclosure. In descriptions of this disclosure, "/" means "or" unless otherwise specified. For example, A/B may represent A or B. In this specification, "and/or" indicates only an association relationship for describing associated objects and represents that three relationships may exist. For example, A and/or B may represent the following three cases: Only A exists, both A and B exist, and only B exists. In addition, in the descriptions of this disclosure, "a plurality of" means two or more than two.

Figure 1:
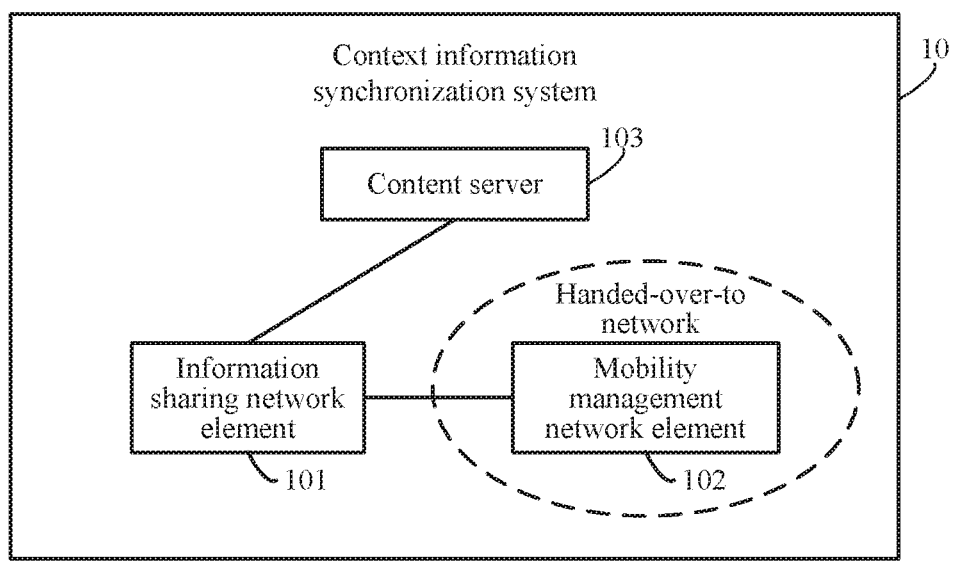
FIG. 1 is a schematic architectural diagram of a terminal monitoring information synchronization system according to an embodiment of this disclosure.

FIG. 1 is a schematic architectural diagram of a terminal monitoring information synchronization system 10 according to an embodiment of this disclosure. The terminal monitoring information synchronization system 10 includes an information sharing network element 101, a content server 103, and a mobility management network element 102 in a handed-over-to network.

The information sharing network element 101 is a network node that can intercommunicate with a first network and a second network. For example, the information sharing network element 101 is a network node shared by the first network and the second network.

The mobility management network element 102 in the handed-over-to network is a network node in the handed-over-to network. For example, when a terminal is handed over from the first network to the second network, the mobility management network element 102 in the handed-over-to network is a network node in the second network; when the terminal is handed over from the second network to the first network, the mobility management network element 102 in the handed-over-to network is a network node in the first network.

The content server 103 is a separately deployed network node and does not belong to either network. For example, the content server 103 may be a service capability server (SCS) or an application server (AS). This is not specifically limited in this embodiment of this disclosure.

It should be noted that the information sharing network element 101 and the mobility management network element 102 in FIG. 1 may communicate directly or may communicate through forwarding of another network node; and the information sharing network element 101 and the content server 103 in FIG. 1 may communicate directly or may communicate through forwarding of another network node. This is not specifically limited in this embodiment of this disclosure.

For example, the first network may be an unlicensed spectrum network, for example, a MulteFire network; and the second network may be a 3rd generation partnership project (3GPP) network, for example, a long term evolution (LTE) network.

Certainly, the first network in this embodiment of this disclosure is not limited to the unlicensed spectrum network, and likewise, the second network in this embodiment of this disclosure is not limited to the 3GPP network. This embodiment of this disclosure is applicable to all architectures in which a terminal is handed over between two networks, and such networks include an LIE network, a MulteFire network, a home eNodeB network, a global system for mobile communications (GSM) network, a wideband code division multiple access (WCDMA) network, a non-3GPP network, a future 5th generation (5G) network, another future network, and the like. The non-3GPP network may be, for example, a wireless fidelity (WIFI) access mobile network.

Figure 2:
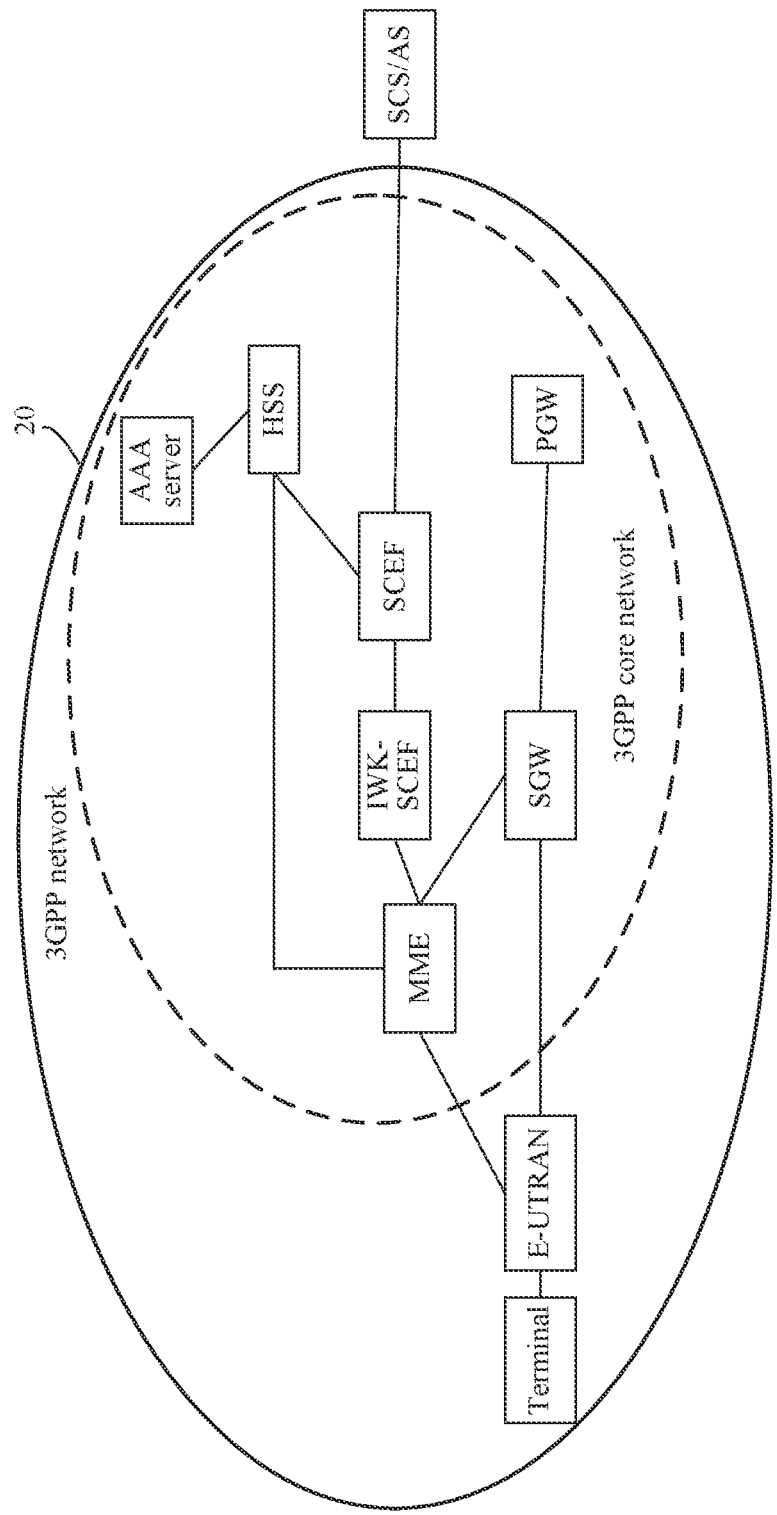
FIG. 2 is a schematic architectural diagram of a 3GPP network according to an embodiment of this disclosure.

FIG. 2 is a schematic architectural diagram of a 3GPP network 20 according to an embodiment of this disclosure. The 3GPP network 20 includes a terminal, an evolved universal terrestrial radio access network (E-UTRAN), and a 3GPP core network. The terminal accesses the 3GPP core network through the E-UTRAN. The 3GPP core network includes a mobility management entity (MME), a serving gateway (SGW), an interworking (IWK)-service capability exposure function (SCEF) network element, an SCEF, a packet data network gateway (PGW), a home subscriber server, and a 3GPP authentication, authorization and accounting (AAA) server. For connection relationships between the network nodes, refer to FIG. 2, and details are not described herein. In addition, FIG. 2 further includes a service capability server (SCS)/an application server (AS), and the SCS/AS communicates with the SCEF.

Specifically, the MME is a mobility management network element, and is responsible for non-access stratum (NAS) signaling between the MME and a terminal, encryption of the NAS signaling, allocation of a temporary identity to the terminal, selection of core-network network elements such as an SGW and a PGW, and providing of functions such as roaming, tracking, and security. The SGW serves as a local mobility anchor for a handover between base stations and provides a function related to lawful interception. The PGW is responsible for user address allocation, execution of a policy control and charging rule, and a function related to lawful interception. In addition, the PGW is a gateway device of a service provider, and data eventually comes in and out of the PGW. The AAA server is used by the service provider to authenticate the terminal. The HSS is configured to store user subscription information, and in this embodiment of this disclosure, the HSS is further configured to store context information. The IWK-SCEF is an intermediate network element for interaction between the MME and the SCEF. The SCEF is a service capability exposure function network element, and is an intermediate network element for interaction between the SCS/AS and the IWK-SCEF. The AS is an application server, for example, a Baidu server, which is a Chinese server. The SCS is a server capable of providing value-added services.

Although not shown, the 3GPP network 20 may further include a network node such as a serving general packet radio service (GPRS) support node (SGSN) or a policy and charging rules function (PCRF) network node. This is not specifically limited in this embodiment of this disclosure.

Figure 3:
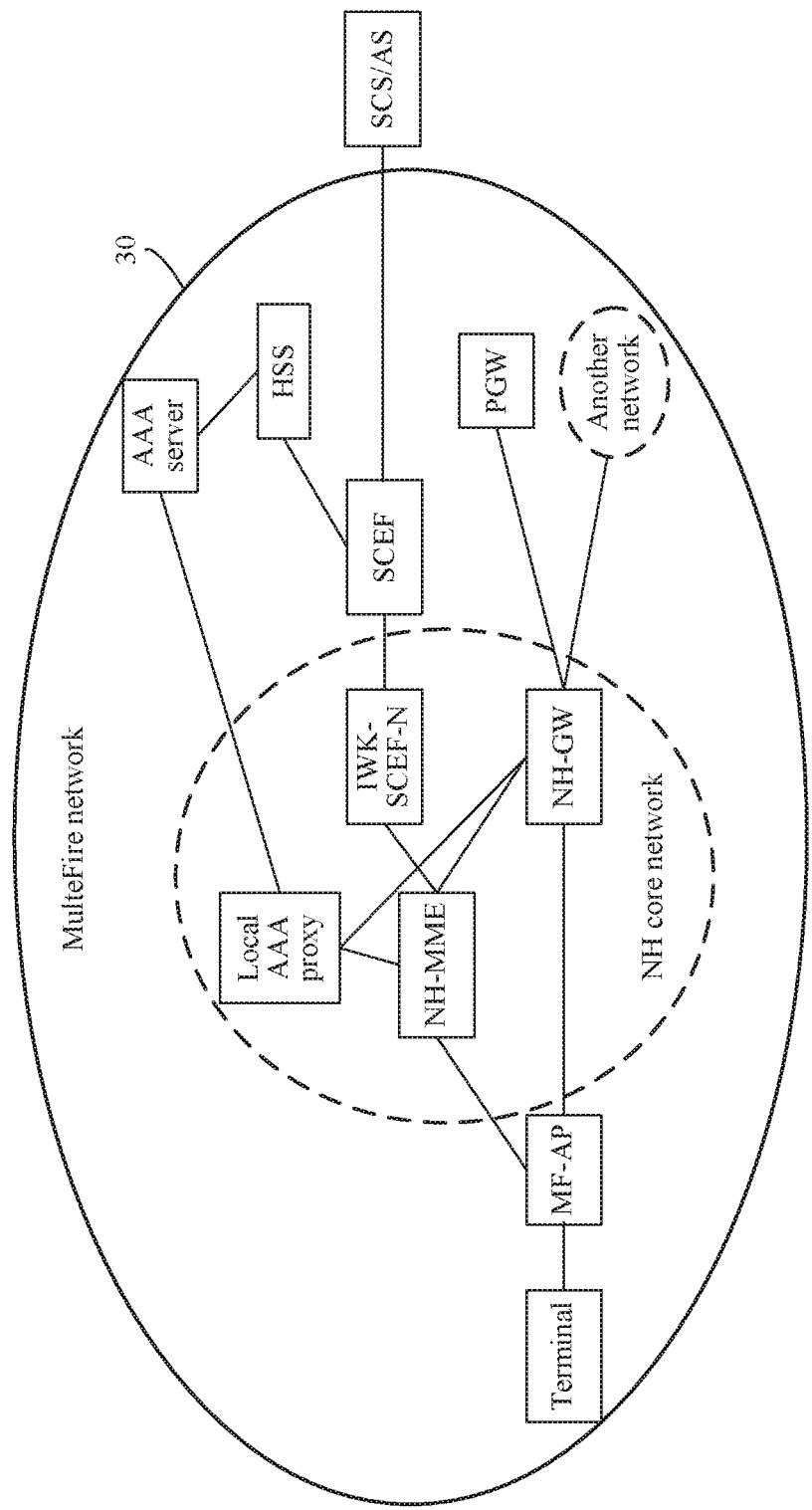
FIG. 3 is a schematic architectural diagram of a MulteFire network according to an embodiment of this disclosure.

FIG. 3 is a schematic architectural diagram of a MulteFire network 30 according to an embodiment of this disclosure. The MulteFire network 30 includes a terminal, an MF-access point (AP), a neutral host (NH) core network, an AAA server, an SCEF, an HSS, and a PGW. The terminal accesses the NH core network through the MF-AP. The NH core network includes an NH MME, an IWK-SCEF-N, an NH-GW, and a local AAA proxy entity. For connection relationships between the network nodes, refer to FIG. 3, and details are not described herein. In addition, FIG. 3 further includes an SCS/AS, and the SCS/AS communicates with the SCEF.

Specifically, the MF AP is an access network device and is responsible for direct communication with the terminal. The NH MME is responsible for network connection establishment and a mobility management function. The local AAA proxy is an intermediate network element for interaction between the NH core network and the AAA server of a service provider. The NH GW is a gateway device. The IWK-SCEF-N is an intermediate network element for interaction between the NH MME and the SCEF. The PGW is responsible for user address allocation, execution of a policy control and charging rule, and a function related to lawful interception. In addition, the PGW is a gateway device of the service provider, and data eventually comes in and out of the PGW. The AAA server is used by the service provider to authenticate the terminal. The HSS is configured to store user subscription information, and in this embodiment of this disclosure, the HSS is further configured to store context information. The IWK-SCEF is an intermediate network element for interaction between the MME and the SCEF. The SCEF is a service capability exposure function network element, and is an intermediate network element for interaction between the SCS/AS and the IWK-SCEF. The AS is an application server, for example, a Baidu server. The SCS is a server capable of providing value-added services.

Although not shown, the MulteFire network 30 may further include another network node. This is not specifically limited in this embodiment of this disclosure.

It should be noted that in FIG. 2 and FIG. 3, the AAA servers, the HSSs, the SCEFs, and the PGWs are network nodes deployed by a mobile operator and are also information sharing network elements of the 3GPP network 20 and the MulteFire network 30; the MME is a mobility management network element of the 3GPP network; the NH MME is a mobility management network element of the MulteFire network; and the SCSs/ASs are separately deployed network nodes and do not belong to either network. This clarification is provided herein once and for all, and is not repeated below.

It should be noted that names of the network nodes in the 3GPP network 20 and the MulteFire network 30 do not constitute any limitation on devices. In some descriptions, the network nodes in the 3GPP network and the MulteFire network may alternatively have other names. For example, "HSS" may be alternatively replaced with "database entity", "user subscription database" (USD), or "unified data management" (UDM). This is not specifically limited in the embodiments of this disclosure.

It should be noted that the terminal in this disclosure may include any handheld device, vehicle-mounted device, wearable device, or computing device with a wireless communication function, or another processing device connected to a wireless modem, and any form of terminal, mobile station (MS), user equipment (UE), terminal equipment, soft terminal, or the like. For ease of description, the devices mentioned above are collectively referred to as terminals in this disclosure.

In addition, the information sharing network element 101 or the mobility management network element 102 in FIG. 1 of the embodiments of this disclosure may be implemented by one entity device or may be implemented by a plurality of entity devices jointly. The information sharing network element 101 and the mobility management network element 102 in the embodiment of this disclosure may be implemented by different entity devices respectively, or may both be implemented by a same entity device. This is not specifically limited in the embodiment of this disclosure. In other words, it can be understood that the information sharing network element 101 and the mobility management network element 102 in the embodiment of this disclosure each may be a logical function module in an entity device or may be a logical function module including a plurality of entity devices. This is not specifically limited in the embodiment of this disclosure.

Figure 4:
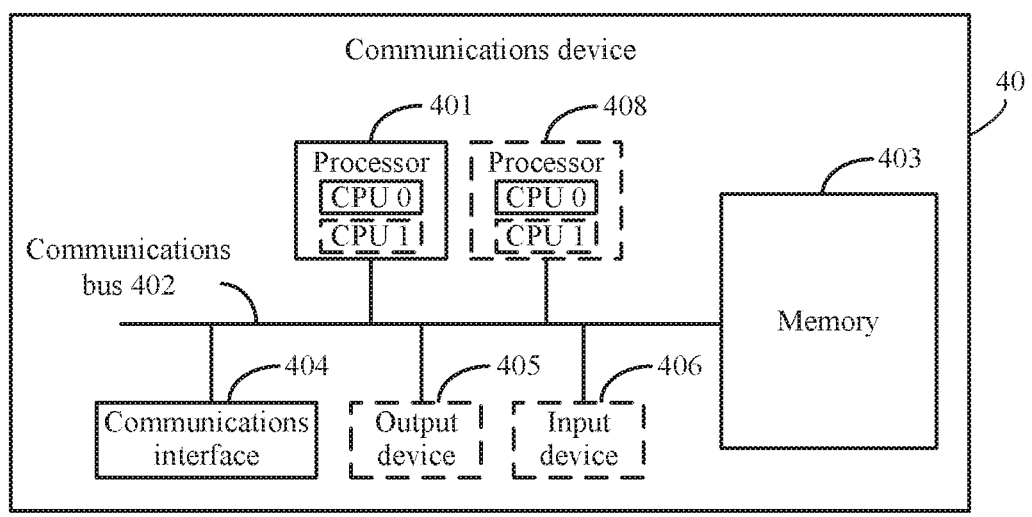
FIG. 4 is a schematic diagram of a hardware structure of a communications device according to an embodiment of this disclosure.

For example, as shown in FIG. 4, the information sharing network element 101 and the mobility management network element 102 in FIG. 1 may be implemented by a communications device in FIG. 4.

FIG. 4 is a schematic diagram of a hardware structure of the communications device according to an embodiment of this disclosure. The communications device 40 includes at least one processor 401, a communications bus 402, a memory 403, and at least one communications interface 404.

The processor 401 may be a general-purpose central processing unit (CPU), a microprocessor, an application-specific integrated circuit (ASIC), or one or more integrated circuits for controlling execution of programs of the solutions of this disclosure.

The communications bus 402 may include a path for transferring information between the foregoing components.

The communications interface 404 is configured to communicate, by using any apparatus such as a transceiver, with another device or a communications network, such as an Ethernet network, a radio access network (RAN), or a wireless local area network (WLAN).

The memory 403 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory 403 is not limited thereto. The memory may exist independently, and be connected to the processor by using the bus. The memory may be alternatively integrated with the processor.

The memory 403 is configured to store application program code for executing the solutions of this disclosure, and the processor 401 controls the execution. The processor 401 is configured to execute the application program code stored in the memory 403, to implement a terminal monitoring information synchronization method provided in the embodiments of this disclosure.

During specific implementation, in an embodiment, the processor 401 may include one or more CPUs, for example, a CPU 0 and a CPU 1 in FIG. 4.

During specific implementation, in an embodiment, the communications device 40 may include a plurality of processors, for example, the processor 401 and a processor 408 in FIG. 4. Each of the processors may be a single-core (single-CPU) processor, or may be a multi-core (multi-CPU) processor. The processor herein may be one or more devices, circuits, and/or processing cores used for processing data (for example, computer program instructions).

During specific implementation, in an embodiment, the communications device 40 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive a user input in a plurality of manners. For example, the input device 406 may be a mouse, a keyboard, a touchscreen device, or a sensor device.

The communications device 40 may be a general-purpose backup communications device or a dedicated communications device. During specific implementation, the communications device 40 may be a desktop computer, a portable computer, a network server, a palmtop computer (PDA), a mobile phone, a tablet computer, a wireless terminal device, an embedded device, or a device in a structure similar to that in FIG. 4. A type of the communications device 40 is not limited in this embodiment of this disclosure.

Figure 5:
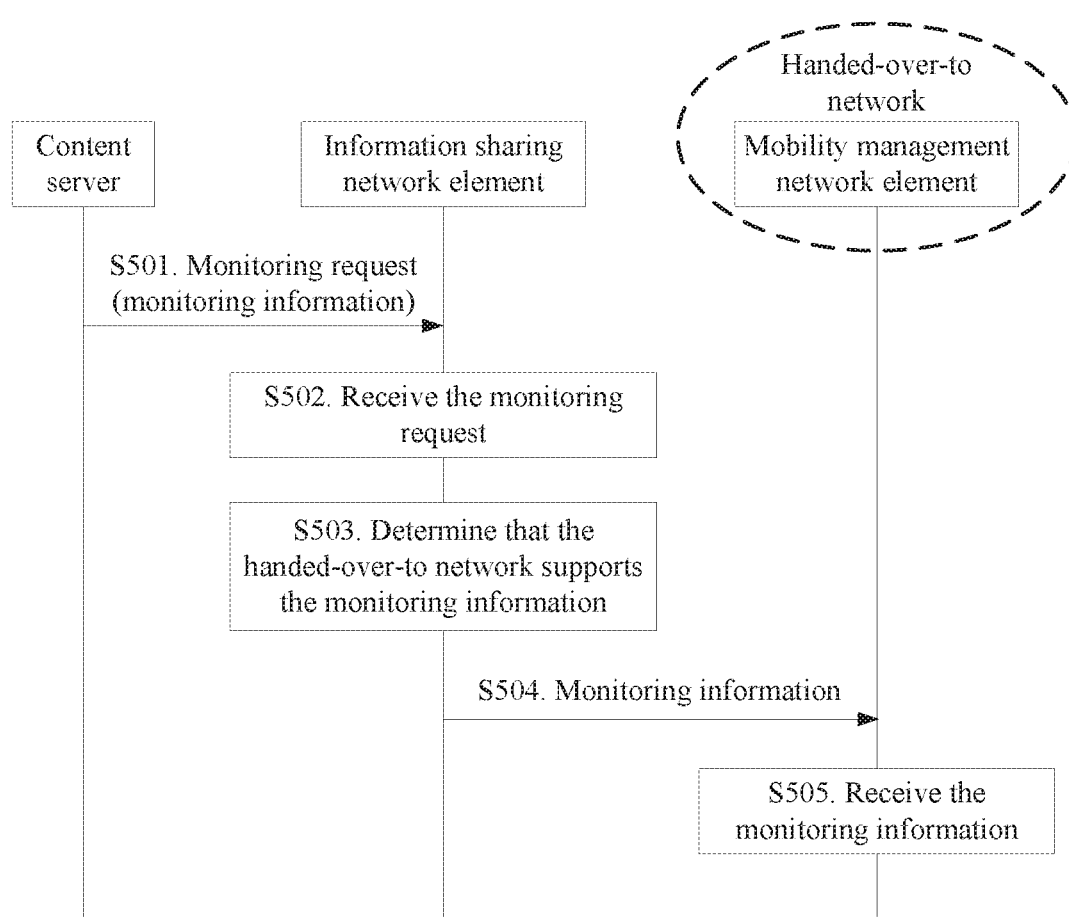
FIG. 5 is a schematic flowchart of a terminal monitoring information synchronization method according to an embodiment of this disclosure.

FIG. 5 is a schematic flowchart of a terminal monitoring information synchronization method according to an embodiment of this disclosure. The method relates to interaction between an information sharing network element, a content server, and a mobility management network element in a handed-over-to network, and includes the following steps.

S501. The content server sends a monitoring request to the information sharing network element, where the monitoring request includes monitoring information of a terminal.

In this embodiment of this disclosure, the monitoring information of the terminal is used to monitor a status of the terminal, for example, to monitor whether the terminal is online or offline.

Optionally, in this embodiment of this disclosure, the monitoring information of the terminal includes at least one of a monitoring type, monitoring duration, or a maximum report quantity. The monitoring type may be, for example, one or more of the following: "terminal disconnected", "terminal obtainable", "location reporting", "communication failed", and "terminal obtainable after a downlink data notification failure". "Terminal obtainable" specifically means that the terminal can be reached.

S502. The information sharing network element receives the monitoring request from the content server.

Optionally, after receiving the monitoring request from the content server, the information sharing network element may further store the monitoring information in the monitoring request; or the monitoring request further includes identification information of the terminal, and after receiving the monitoring request from the content server, the information sharing network element further determines, based on the identification information of the terminal, that the terminal subscribes to the handed-over-to network and the terminal can be handed over between a first network and a second network, and then stores the monitoring information in the monitoring request. This is not specifically limited in this embodiment of this disclosure. The information sharing network element stores the monitoring information in the monitoring request only after determining that the terminal subscribes to the handed-over-to network and the terminal can be handed over between the first network and the second network. This can save storage resources of the information sharing network element and avoid unnecessary storage operations.

S503. When the terminal is handed over between the first network and the second network, the information sharing network element determines that the handed-over-to network supports the monitoring information.

S504. The information sharing network element sends the monitoring information to the mobility management network element in the handed-over-to network.

S505. The mobility management network element in the handed-over-to network receives the monitoring information from the information sharing network element. The monitoring information is monitoring information of the terminal in a handed-over-from network.

Steps S501 and S502 belong to a terminal monitoring information configuration process in a terminal monitoring information synchronization process, and steps S503 to S505 belong to a handover process in the terminal monitoring information synchronization process.

According to the terminal monitoring information synchronization method provided in this embodiment of this disclosure, the information sharing network element can receive, from the content server, the monitoring request including the monitoring information of the terminal in the handed-over-from network, and send the monitoring information to the mobility management network element in the handed-over-to network when determining that the handed-over-to network supports the monitoring information. Therefore, when a network handover occurs, the mobility management network element in the handed-over-to network can keep terminal monitoring continuous based on the monitoring information.

Actions of the information sharing network element in steps S502, S503, and S504 may be performed by the processor 401 in the communications device 40 shown in FIG. 4, by invoking the application program code stored in the memory 403. This is not limited in this embodiment of this disclosure.

The following describes, in detail with reference to FIG. 6 to FIG. 9, the terminal monitoring information synchronization method shown in FIG. 5.

The terminal monitoring information configuration process in steps S501 and S502 shown in FIG. 5 is first described in detail with reference to FIG. 6 and FIG. 7.

For example, the terminal is handed over from a Multe-Fire network to a 3GPP network, the information sharing network element is an HSS, the content server is an SCS/AS, and the mobility management network element is an NH MME. FIG. 6 is a schematic diagram of a terminal monitoring information configuration procedure according to an embodiment of this disclosure. The procedure relates to interaction between the NH MME, the HSS, an SCEF, and the SCS/AS, and includes the following steps.

S601. The SCS/AS sends a monitoring request to the SCEF, so that the SCEF receives the monitoring request. The monitoring request includes monitoring information of the terminal in the MulteFire network.

In this embodiment of this disclosure, a process of initiating the monitoring request by the SCS/AS is a process of terminal monitoring information configuration, that is, a process of requiring, by the SCS/AS, the MulteFire network to perform monitoring.

For descriptions about the monitoring request and the monitoring information, refer to step S501, and details are not described herein again.

S602. The SCEF performs corresponding processing on the monitoring request, for example, performs an operation such as verifying whether the SCS/AS has the right to request monitoring.

S603. The SCEF sends the monitoring request to the HSS, so that the HSS receives the monitoring request. The monitoring request includes the monitoring information.

S604. The HSS performs corresponding processing on the monitoring request, for example, verifies, based on identification information of the to-be-monitored terminal included in the monitoring request, whether the to-be-monitored terminal is allowed to be monitored; and if the to-be-monitored terminal is allowed to be monitored, the HSS further identifies, based on the identification information of the terminal, whether the terminal subscribes to the 3GPP network and whether the terminal can be handed over between the MulteFire network and the 3GPP network, and stores the monitoring information if the terminal subscribes to the 3GPP network and can be handed over between the MulteFire network and the 3GPP network.

S605. The HSS sends a monitoring response to the SCS/AS, so that the SCS/AS receives the monitoring response. The monitoring response is used to indicate that monitoring is allowed/rejected.

If monitoring is allowed, steps S606 to S609 are further performed.

S606. The HSS sends an insert subscriber data request to the NH MME, so that the NH MME receives the insert subscriber data request. The insert subscriber data request carries the monitoring request, to request the NH MME to perform monitoring.

S607. The NH MME performs corresponding processing on the monitoring request, for example, determines whether the monitoring request can be executed.

S608. The NH MME sends an insert subscriber data answer to the HSS, so that the HSS receives the insert subscriber data answer.

S609. The HSS sends a monitoring configuration response to the SCS/AS, so that the SCS/AS receives the monitoring configuration response.

At this point, the entire process of terminal monitoring information configuration ends.

Figure 6:
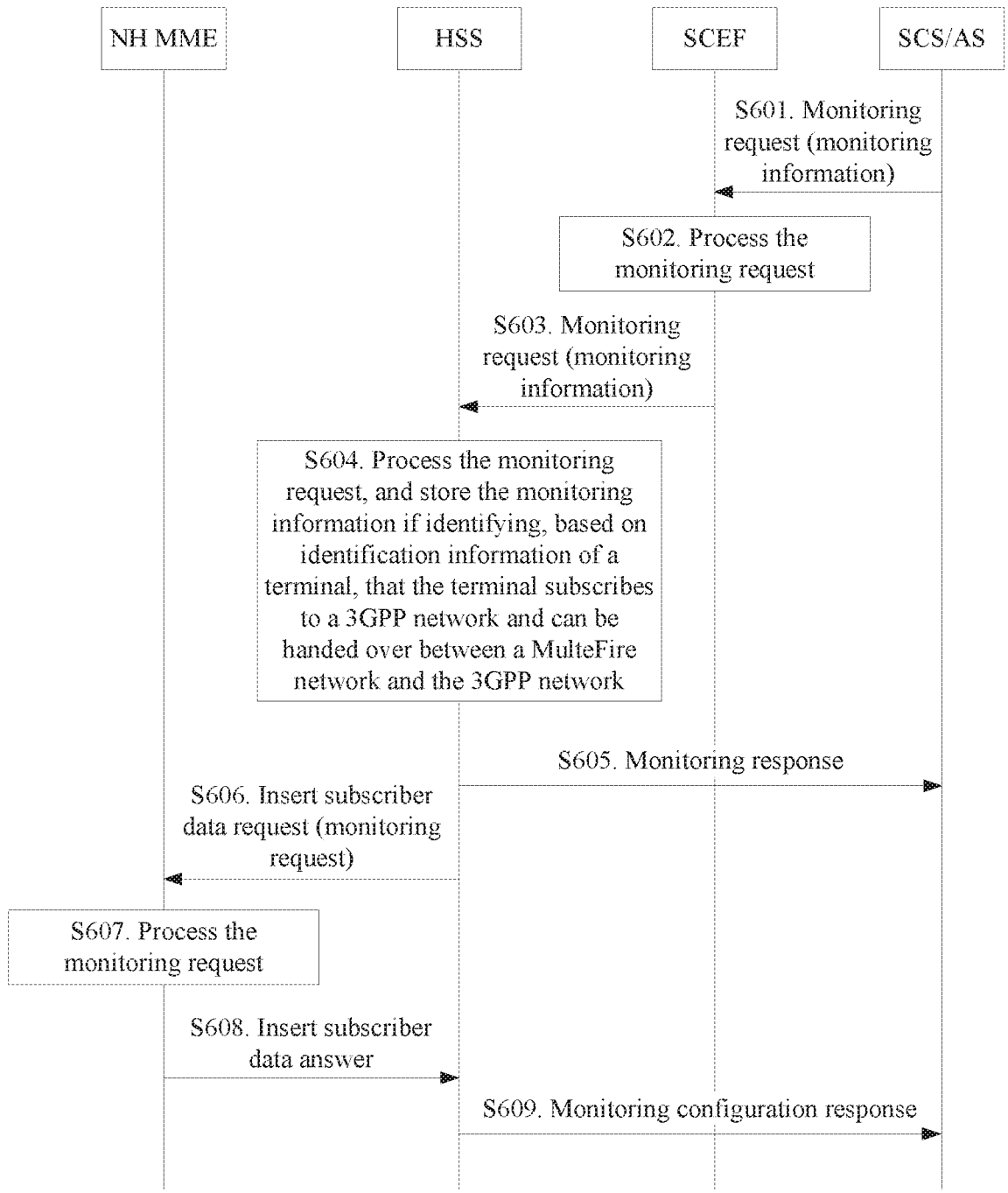
FIG. 6 is a schematic diagram of a terminal monitoring information configuration procedure according to an embodiment of this disclosure.

It should be noted that in the embodiment shown in FIG. 6, the network nodes may communicate with each other directly, or may communicate with each other through another network node. For details, refer to the schematic architectural diagram of the MulteFire network shown in FIG. 3, and details are not described herein again in this embodiment of this disclosure. For example, that the HSS sends a monitoring configuration response to the SCS/AS in step S609 specifically includes: The HSS sends the monitoring configuration response to the SCS/AS through the SCEF.

Actions of the NH MME in the embodiment shown in FIG. 6 may be performed by the processor 401 in the communications device 40 shown in FIG. 4, by invoking the application program code stored in the memory 403. This is not limited in this embodiment of this disclosure.

Actions of the HSS in the embodiment shown in FIG. 6 may be performed by the processor 401 in the communications device 40 shown in FIG. 4, by invoking the application program code stored in the memory 403. This is not limited in this embodiment of this disclosure.

Alternatively, for example, the terminal is handed over from a 3GPP network to a MulteFire network, the information sharing network element is an HSS, the content server is an SCS/AS, and the mobility management network element is an MME. FIG. 7 is a schematic diagram of a terminal monitoring information configuration procedure according to an embodiment of this disclosure. The procedure relates to interaction between the MME, the HSS, an SCEF, and the SCS/AS, and includes the following steps.

S701. The SCS/AS sends a monitoring request to the SCEF, so that the SCEF receives the monitoring request. The monitoring request includes monitoring information of the terminal in the 3GPP network.

In this embodiment of this disclosure, a process of initiating the monitoring request by the SCS/AS is a process of terminal monitoring information configuration, that is, a process of requiring, by the SCS/AS, the 3GPP network to perform monitoring.

For descriptions about the monitoring request and the monitoring information, refer to step S501, and details are not described herein again.

S702. The SCEF performs corresponding processing on the monitoring request, for example, performs an operation such as verifying whether the SCS/AS has the right to request monitoring.

S703. The SCEF sends the monitoring request to the HSS, so that the HSS receives the monitoring request. The monitoring request includes the monitoring information.

S704. The HSS performs corresponding processing on the monitoring request, for example, verifies, based on identification information of the to-be-monitored terminal included in the monitoring request, whether the to-be-monitored terminal is allowed to be monitored; and if the to-be-monitored terminal is allowed to be monitored, the HSS further identifies, based on the identification information of the terminal, whether the terminal subscribes to the MulteFire network and whether the terminal can be handed over between the MulteFire network and the 3GPP network, and stores the monitoring information if the terminal subscribes to the MulteFire network and can be handed over between the MulteFire network and the 3GPP network.

S705. The HSS sends a monitoring response to the SCS/AS, so that the SCS/AS receives the monitoring response. The monitoring response is used to indicate that monitoring is allowed/rejected.

If monitoring is allowed, steps S706 to S709 are further performed.

S706. The HSS sends an insert subscriber data request to the MME, so that the MME receives the insert subscriber data request. The insert subscriber data request carries the monitoring request, to request the MME to perform monitoring.

S707. The MME performs corresponding processing on the monitoring request, for example, determines whether the monitoring request can be executed.

S708. The MME sends an insert subscriber data answer to the HSS, so that the HSS receives the insert subscriber data answer.

S709. The HSS sends a monitoring configuration response to the SCS/AS, so that the SCS/AS receives the monitoring configuration response.

At this point, the entire process of terminal monitoring information configuration ends.

Figure 7:
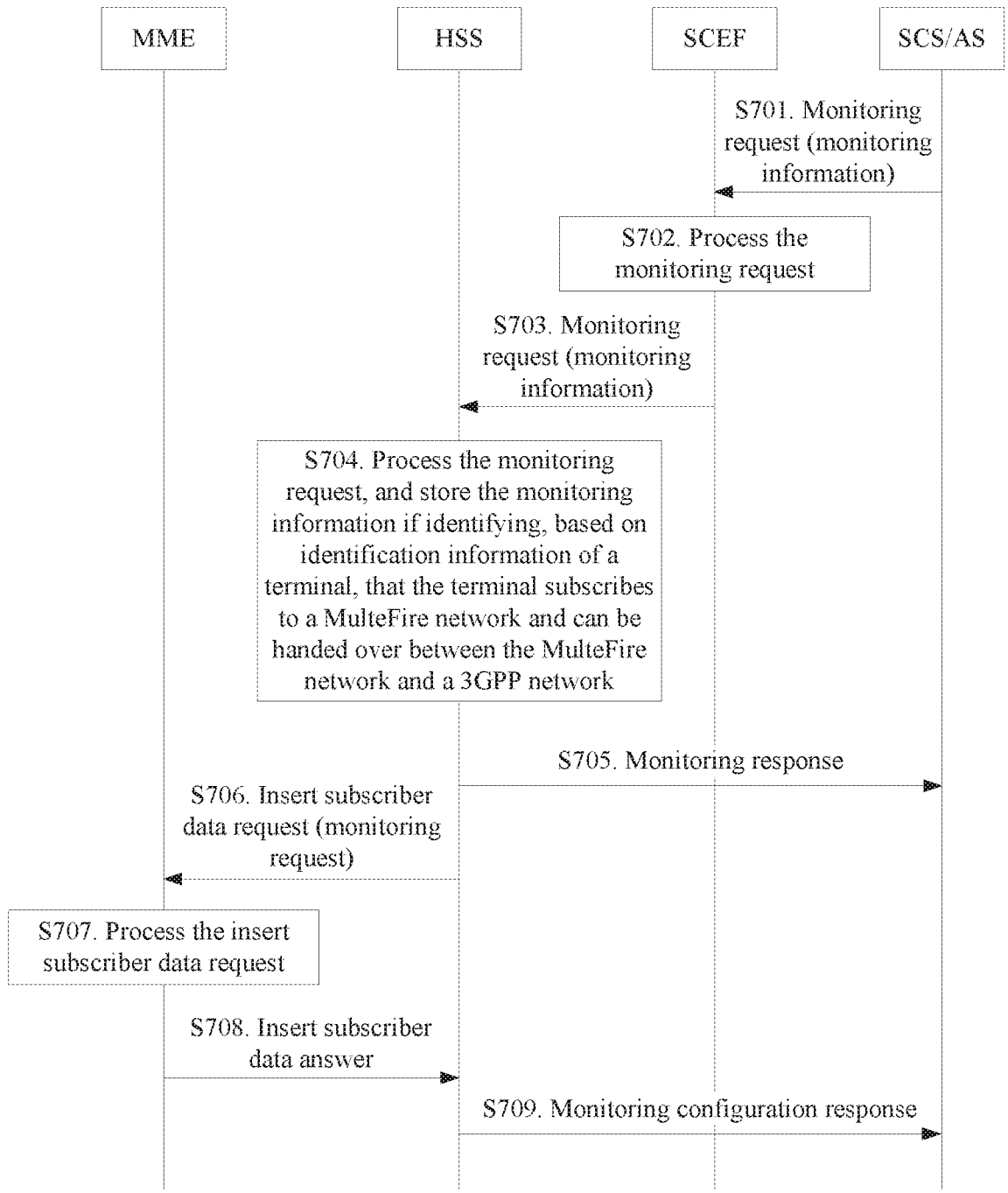
FIG. 7 is a schematic diagram of another terminal monitoring information configuration procedure according to an embodiment of this disclosure.

It should be noted that in the embodiment shown in FIG. 7, the network nodes may communicate with each other directly, or may communicate with each other through another network node. For details, refer to the schematic architectural diagram of the 3GPP network shown in FIG. 2, and details are not described herein again in this embodiment of this disclosure. For example, that the HSS sends a monitoring configuration response to the SCS/AS in step S709 specifically includes: The HSS sends the monitoring configuration response to the SCS/AS through the SCEF.

Actions of the MME in the embodiment shown in FIG. 7 may be performed by the processor 401 in the communications device 40 shown in FIG. 4, by invoking the application program code stored in the memory 403. This is not limited in this embodiment of this disclosure.

Actions of the HSS in the embodiment shown in FIG. 7 may be performed by the processor 401 in the communications device 40 shown in FIG. 4, by invoking the application program code stored in the memory 403. This is not limited in this embodiment of this disclosure.

In addition, when the terminal is handed over between other networks, for a specific process of terminal monitoring information configuration, reference may be made to the embodiment shown in FIG. 6 or FIG. 7, and no further examples are described herein.

The handover process in steps S503 to S505 shown in FIG. 5 is then described in detail with reference to FIG. 8A and FIG. 8B and FIG. 9.

For example, the terminal is handed over from a 3GPP network to a MulteFire network, the information sharing network element is an HSS, the content server is an SCS/AS, and the mobility management network element is an NH MME. FIG. 8A and FIG. 8B are a schematic flowchart of a handover method according to an embodiment of this disclosure. The method relates to interaction between the NH MME, an AAA server, the HSS, an SCEF, and the SCS/AS, and includes the following steps.

S801. The terminal sends an attach request to the NH MME, so that the NH MME receives the attach request. The attach request is used to request to connect to the MulteFire network.

S802. The NH MME sends an extensible authentication protocol-request (EAP-RQ) message to the terminal, so that the terminal receives the EAP-RQ message. The EAP-RQ message is used to request identification information of the terminal.

S803. The terminal sends an extensible authentication protocol-response (EAP-RSP) message to the NH MME, so that the NH MME receives the EAP-RSP message. The EAP-RSP message carries the identification information of the terminal.

S804. The NH-MME sends the EAP-RSP message to the AAA server, so that the AAA server receives the EAP-RSP message. The EAP-RSP message carries the identification information of the terminal.

S805. The AAA server sends an authentication and key agreement (AKA) vector request message to the HSS, so that the HSS receives the AKA vector request message. The AKA vector request message carries the identification information of the terminal and is used to request an AKA vector corresponding to the terminal.

S806. The HSS generates the AKA vector.

S807. The HSS sends the AKA vector to the AAA server, so that the AAA server receives the AKA vector.

S808. The AAA server derives an expected response (RES) (expected RES, XRES) value by using the AKA vector.

Certainly, the AAA server may further derive a keying material (MSK) based on the AKA vector, and the MSK is used to derive and generate an encryption key of a NAS message between the terminal and the NH MME. This is not specifically limited in this embodiment of this disclosure.

S809. The AAA server sends a challenge message to the NH MME by using an EAP-RQ/AKA' message, so that the NH MME receives the challenge message. The challenge message carries the AKA vector.

S810. The NH MME sends the challenge message to the terminal by using the EAP-RQ/AKA' message, so that the terminal receives the challenge message. The challenge message carries the AKA vector.

S811. The terminal runs an AKA procedure, and derives a response (RES) value based on the received AKA vector.

S812. The terminal sends a challenge response message to the NH MME, so that the NH MME receives the challenge response message. The challenge response message carries the RES value derived in step S811.

S813. The NH MME sends the challenge response message to the AAA server, so that the AAA server receives the challenge response message. The challenge response message carries the RES value derived in step S811, monitoring capability indication information of the MulteFire network, and monitoring type indication information of the MulteFire network.

The monitoring capability indication information in this embodiment of this disclosure is used to indicate whether the network is capable of monitoring.

The monitoring type indication information in this embodiment of this disclosure is used to indicate a monitoring type supported by the network when the network is capable of monitoring.

S814. The AAA server verifies whether the received RES value equals the XRES value.

If the received RES value equals the XRES value, step S815 is performed.

S815. The AAA server sends a subscriber data request to the HSS, where the subscriber data request includes the monitoring capability indication information of the MulteFire network.

S816. The HSS determines, based on the monitoring capability indication information of the MulteFire network, whether the MulteFire network is capable of monitoring.

If the HSS determines that the MulteFire network is capable of monitoring, steps S819 to S822 are performed.

If the HSS determines that the MulteFire network is incapable of monitoring, steps S817 and S818 are performed.

S817. The HSS sends a monitoring failure notification to the SCS/AS through the SCEF, so that the SCS/AS receives the monitoring failure notification. The monitoring failure notification message is used to indicate a monitoring information application failure.

Optionally, the monitoring failure notification message is further used to indicate that a cause of the monitoring information application failure is that the terminal is handed over to the MulteFire network and the MulteFire network is incapable of monitoring.

S818. The SCS/AS sends a monitoring failure response to the HSS, so that the HSS receives the monitoring failure response.

S819. The HSS determines, based on the monitoring type indication information of the MulteFire network and a monitoring type in prestored monitoring information in the 3GPP network, whether the MulteFire network supports the monitoring type.

If the HSS determines that the MulteFire network supports the monitoring type, steps S822 to S825 are performed.

If the HSS determines that the MulteFire network does not support the monitoring type, steps S820 and S821 are performed.

S820. The HSS sends a monitoring failure notification to the SCS/AS through the SCEF, so that the SCS/AS receives the monitoring failure notification. The monitoring failure notification message is used to indicate a monitoring information application failure.

Optionally, the monitoring failure notification message is further used to indicate that a cause of the monitoring information application failure is that the terminal is handed over to the MulteFire network and the MulteFire network does not support the monitoring type of the 3GPP network.

S821. The SCS/AS sends a monitoring failure response to the HSS, so that the HSS receives the monitoring failure response.

S822. The HSS sends a subscriber data answer to the AAA server, so that the AAA server receives the subscriber data answer, where the subscriber data answer carries the prestored monitoring information in the 3GPP network.

S823. The AAA server sends an EAP authentication success message to the NH MME, so that the NH MME receives the EAP authentication success message, where the EAP authentication success message carries the monitoring information.

It should be noted that if the MulteFire network is incapable of monitoring, after step S818, the HSS also sends a subscriber data answer to the AAA server, and the AAA server also sends an EAP authentication success message to the NH MME. In this case, the subscriber data answer and the EAP authentication success message do not carry the monitoring information. Alternatively, if the MulteFire network does not support the monitoring type in the prestored monitoring information in the 3GPP network, after step S821, the HSS also sends a subscriber data answer to the AAA server, and the AAA server also sends an EAP authentication success message to the NH MME. In this case, the subscriber data answer and the EAP authentication success message do not carry the monitoring information.

S824. The NH MME continues monitoring in the MulteFire network based on the monitoring information.

S825. The NH MME sends the EAP authentication success message to the terminal, so that the terminal receives the EAP authentication success message.

At this point, the process of handover from the 3GPP network to the MulteFire network ends.

Optionally, in this embodiment of this disclosure, the monitoring capability indication information of the MulteFire network may be alternatively replaced with monitoring capability indication information of a node in a target node set. The target node set includes at least one network node in the MulteFire network, and the at least one network node includes the NH MME. Further, the HSS may determine, based on the monitoring capability indication information of the node in the target node set, whether the node in the target node set is capable of monitoring. For example, if all nodes in the target node set are capable of monitoring, the HSS determines that the MulteFire network is capable of monitoring; if the target node set includes a node that is incapable of monitoring, the HSS determines that the MulteFire network is incapable of monitoring.

Alternatively, optionally, in this embodiment of this disclosure, the monitoring capability indication information of the MulteFire network may be replaced with identification information of the MulteFire network. The HSS may query, based on the identification information of the MulteFire network, whether the MulteFire network is capable of monitoring.

Alternatively, optionally, in this embodiment of this disclosure, the identification information of the MulteFire network may be replaced with identification information of a node in a target node set. The target node set includes at least one network node in the MulteFire network, and the at least one network node includes the NH MME. Further, the HSS may query, based on the identification information of the node in the target node set, whether the node in the target node set is capable of monitoring. For example, if all nodes in the target node set are capable of monitoring, the HSS determines that the MulteFire network is capable of monitoring; if the target node set includes a node that is incapable of monitoring, the HSS determines that the MulteFire network is incapable of monitoring.

This embodiment of this disclosure imposes no specific limitation on how to determine whether the MulteFire network is capable of monitoring.

Optionally, in this embodiment of this disclosure, the monitoring type indication information of the MulteFire network may be alternatively replaced with monitoring type indication information of a node in a target node set. The target node set includes at least one network node in the MulteFire network, and the at least one network node includes the NH MME. Further, the HSS may determine, based on the monitoring type indication information of the node in the target node set, whether the node in the target node set supports the monitoring type in the prestored monitoring information in the 3GPP network. For example, if all nodes in the target node set support the monitoring type in the prestored monitoring information in the 3GPP network, the HSS determines that the MulteFire network supports the monitoring type in the prestored monitoring information in the 3GPP network; if the target node set includes a node that does not support the monitoring type in the prestored monitoring information in the 3GPP network, the HSS determines that the MulteFire network does not support the monitoring type in the prestored monitoring information in the 3GPP network.

Alternatively, optionally, in this embodiment of this disclosure, the monitoring type indication information of the MulteFire network may be replaced with identification information of the MulteFire network. The HSS may query, based on the identification information of the MulteFire network, whether the MulteFire network supports the monitoring type in the prestored monitoring information in the 3GPP network.

Alternatively, optionally, in this embodiment of this disclosure, the identification information of the MulteFire network may be replaced with identification information of a node in a target node set. The target node set includes at least one network node in the MulteFire network, and the at least one network node includes the NH MME. Further, the HSS may query, based on the identification information of the node in the target node set, whether the node in the target node set supports the monitoring type in the prestored monitoring information in the 3GPP network. For example, if all nodes in the target node set support the monitoring type in the prestored monitoring information in the 3GPP network, the HSS determines that the MulteFire network supports the monitoring type in the prestored monitoring information in the 3GPP network; if the target node set includes a node that does not support the monitoring type in the prestored monitoring information in the 3GPP network, the HSS determines that the MulteFire network does not support the monitoring type in the prestored monitoring information in the 3GPP network.

This embodiment of this disclosure imposes no specific limitation on how to determine whether the MulteFire network supports the monitoring type in the prestored monitoring information in the 3GPP network.

Figure 8A:
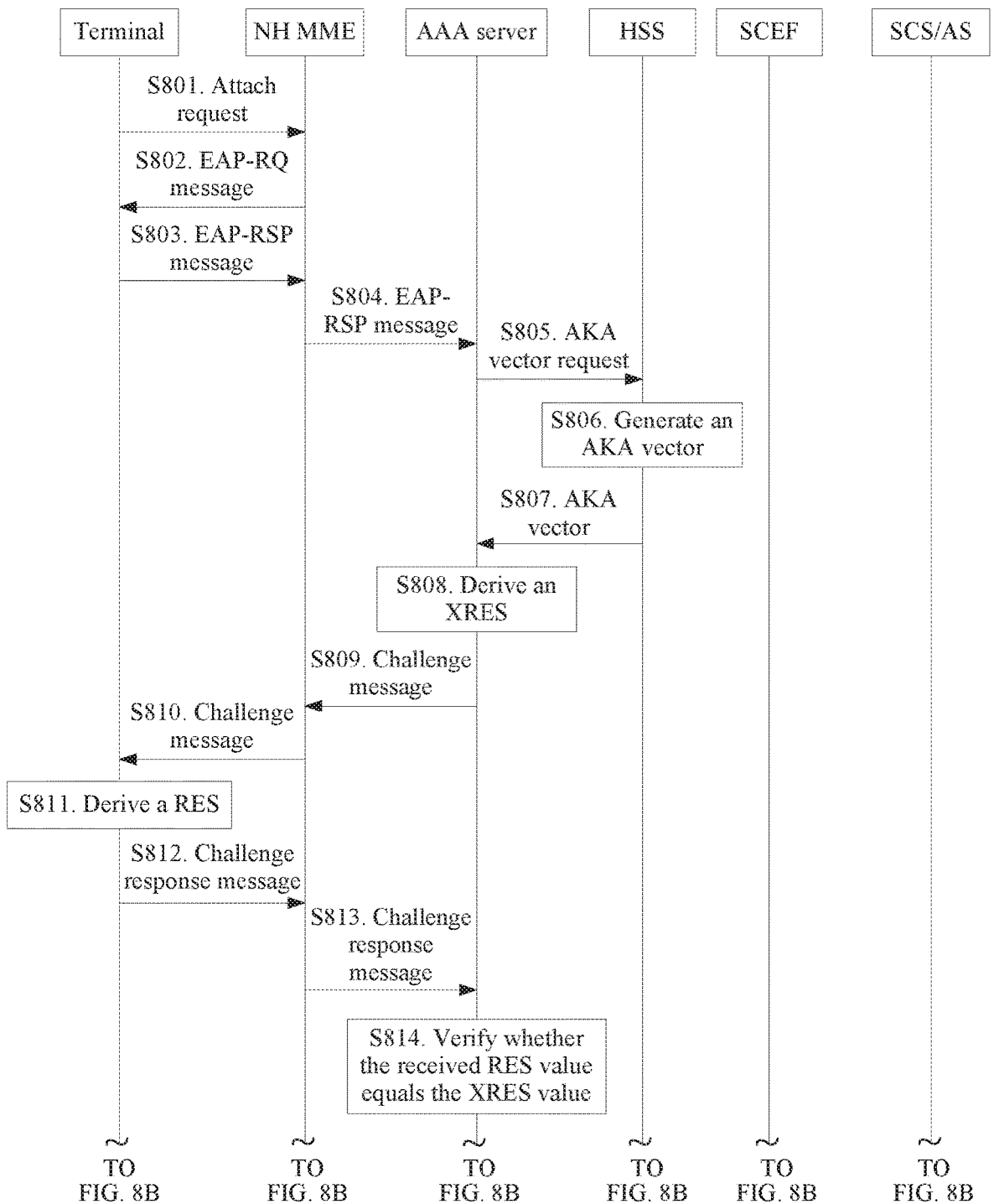
FIG. 8A and FIG. 8B are a schematic flowchart of a handover method according to an embodiment of this disclosure.
Figure 8B:
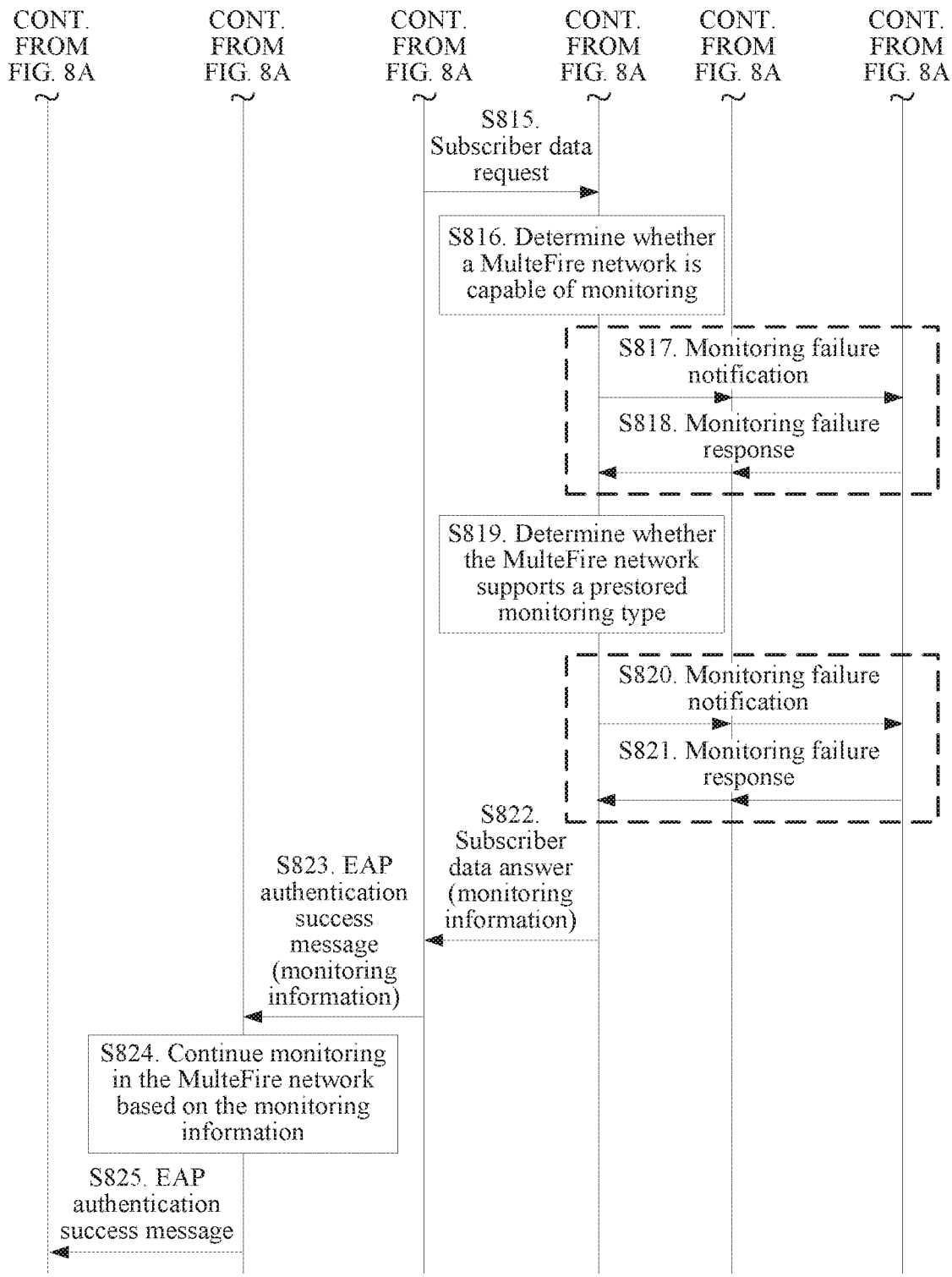

Actions of the NH MME in the embodiment shown in FIG. 8A and FIG. 8B may be performed by the processor 401 in the communications device 40 shown in FIG. 4, by invoking the application program code stored in the memory 403. This is not limited in this embodiment of this disclosure.

Actions of the HSS in the embodiment shown in FIG. 8A and FIG. 8B may be performed by the processor 401 in the communications device 40 shown in FIG. 4, by invoking the application program code stored in the memory 403. This is not limited in this embodiment of this disclosure.

Alternatively, for example, the terminal is handed over from a MulteFire network to a 3GPP network, the information sharing network element is an HSS, the content server is an SCS/AS, and the mobility management network element is an MME. FIG. 9 is a schematic flowchart of a handover method according to an embodiment of this disclosure. The method relates to interaction between the terminal, the MME, an SGW, a PGW, the HSS, an SCEF, and the SCS/AS, and includes the following steps.

S901. The terminal sends an attach request to the MME, so that the MME receives the attach request. The attach request is used to request to connect to the 3GPP network.

S902. The MME sends a location update and subscriber data retrieval message to the HSS, so that the HSS receives the location update and subscriber data retrieval message. The location update and subscriber data retrieval message carries monitoring type indication information of the 3GPP network.

Optionally, the attach message and the location update and subscriber data retrieval message may further carry identification information of the terminal, and the identification information of the terminal is used to obtain subscriber data of the terminal. This is not specifically limited in this embodiment of this disclosure.

S903. The HSS determines, based on the monitoring type indication information of the 3GPP network and a monitoring type in prestored monitoring information in the MulteFire network, whether the 3GPP network supports the monitoring type.

If the HSS determines that the 3GPP network supports the monitoring type, steps S906 to S908 are performed.

If the HSS determines that the 3GPP network does not support the monitoring type, steps S904 and S905 are performed.

S904. The HSS sends a monitoring failure notification message to the SCS/AS through the SCEF, so that the SCS/AS receives the monitoring failure notification message. The monitoring failure notification message is used to indicate a monitoring information application failure.

Optionally, the monitoring failure notification message is further used to indicate that a cause of the monitoring information application failure is that the terminal is handed over to the 3GPP network and the 3GPP network does not support the monitoring type of the MulteFire network.

S905. The SCS/AS sends a monitoring failure response to the HSS, so that the HSS receives the monitoring failure response.

S906. The HSS sends a location update and subscriber data retrieval response message to the MME, so that the MME receives the location update and subscriber data retrieval response message. The location update and subscriber data retrieval response message carries the monitoring information.

It should be noted that if the 3GPP network does not support the monitoring type, after step S904, the HSS also sends a location update and subscriber data retrieval response message to the MME, and in this case, the location update and subscriber data retrieval response message does not carry the monitoring information.

S907. The MME continues monitoring in the 3GPP network based on the monitoring information.

S908. The MME sends an attach response to the terminal, so that the terminal receives the attach response.

The MME may send the attach response to the terminal in a process of releasing a bearer connection of the 3GPP network and a bearer connection of the MulteFire network. This is not specifically limited in this embodiment of this disclosure.

At this point, the process of handover from the MulteFire network to the 3GPP network ends.

Optionally, in this embodiment of this disclosure, the monitoring type indication information of the 3GPP network may be alternatively replaced with monitoring type indication information of a node in a target node set. The target node set includes at least one network node in the 3GPP network, and the at least one network node includes the MME. Further, the HSS may determine, based on the monitoring type indication information of the node in the target node set, whether the node in the target node set supports the monitoring type in the prestored monitoring information in the MulteFire network. For example, if all nodes in the target node set support the monitoring type in the prestored monitoring information in the MulteFire network, the HSS determines that the 3GPP network supports the monitoring type in the prestored monitoring information in the MulteFire network; if the target node set includes a node that does not support the monitoring type in the prestored monitoring information in the MulteFire network, the HSS determines that the 3GPP network does not support the monitoring type in the prestored monitoring information in the MulteFire network.

Alternatively, optionally, in this embodiment of this disclosure, the monitoring type indication information of the 3GPP network may be replaced with identification information of the 3GPP network. The HSS may query, based on the identification information of the 3GPP network, whether the 3GPP network supports the monitoring type in the prestored monitoring information in the MulteFire network.

Alternatively, optionally, in this embodiment of this disclosure, the identification information of the 3GPP network may be replaced with identification information of a node in a target node set. The target node set includes at least one network node in the 3GPP network, and the at least one network node includes the MME. Further, the HSS may query, based on the identification information of the node in the target node set, whether the node in the target node set supports the monitoring type in the prestored monitoring information in the MulteFire network. For example, if all nodes in the target node set support the monitoring type in the prestored monitoring information in the MulteFire network, the HSS determines that the 3GPP network supports the monitoring type in the prestored monitoring information in the MulteFire network; if the target node set includes a node that does not support the monitoring type in the prestored monitoring information in the MulteFire network, the HSS determines that the 3GPP network does not support the monitoring type in the prestored monitoring information in the MulteFire network.

This embodiment of this disclosure imposes no specific limitation on how to determine whether the 3GPP network supports the monitoring type in the prestored monitoring information in the MulteFire network.

Figure 9:
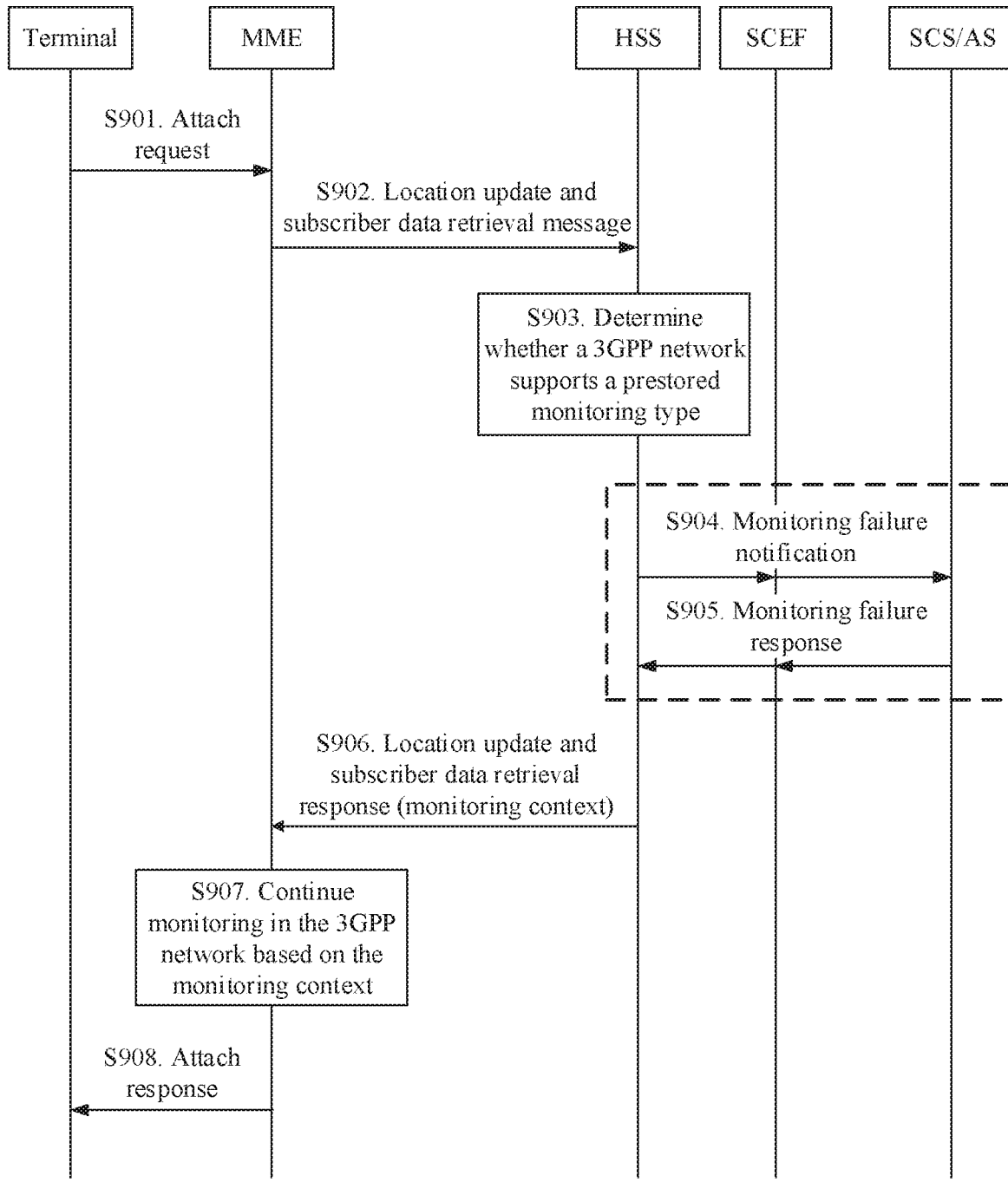
FIG. 9 is a schematic flowchart of another handover method according to an embodiment of this disclosure.

Actions of the MME in the embodiment shown in FIG. 9 may be performed by the processor 401 in the communications device 40 shown in FIG. 4, by invoking the application program code stored in the memory 403. This is not limited in this embodiment of this disclosure.

Actions of the HSS in the embodiment shown in FIG. 9 may be performed by the processor 401 in the communications device 40 shown in FIG. 4, by invoking the application program code stored in the memory 403. This is not limited in this embodiment of this disclosure.

Optionally, the monitoring type in the embodiment shown in FIG. 8A and FIG. 8B or FIG. 9 may be alternatively replaced with at least one of the monitoring type, monitoring duration, and a maximum report quantity. For example, the monitoring type in the embodiment shown in FIG. 8A and FIG. 8B is replaced: When the monitoring information includes the monitoring duration, the HSS may determine whether the MulteFire network supports the monitoring duration, based on monitoring duration indication information of the MulteFire network and the monitoring duration in the prestored monitoring information in the 3GPP network; and if the MulteFire network supports the monitoring duration, steps S822 to S825 are performed. Alternatively, for example, when the monitoring information includes the maximum report quantity, the HSS may determine whether the MulteFire network supports the maximum report quantity, based on maximum report quantity indication information of the MulteFire network and the maximum report quantity in the prestored monitoring information in the 3GPP network; and if the MulteFire network supports the maximum report quantity, steps S822 to S825 are performed. The embodiments of this disclosure impose no specific limitation on which parameter or parameters in the monitoring information should be used to determine whether monitoring information synchronization can be performed.

According to the terminal monitoring information synchronization method provided in the embodiments of this disclosure, the information sharing network element can receive, from the content server, the monitoring request including the monitoring information of the terminal in the handed-over-from network, and send the monitoring information to the mobility management network element in the handed-over-to network when determining that the handed-over-to network supports the monitoring information. Therefore, when a network handover occurs, the mobility management network element in the handed-over-to network can keep terminal monitoring continuous based on the monitoring information.

In addition, it should be noted that the terminal monitoring information synchronization method provided in the embodiments of this disclosure may be extended to a scenario of synchronizing other context information when a terminal is handed over from one network to another. For example, when the terminal is handed over from one network to another, various types of context information such as an enhanced coverage restriction parameter can also be synchronized by using a method similar to that in the embodiments of this disclosure, and no further examples are described herein.

The foregoing mainly describes, in terms of interaction between various network elements, the solutions provided in the embodiments of this disclosure. It can be understood that, to implement the foregoing functions, the foregoing information sharing network element and the mobility management network element include corresponding hardware structures and/or software modules for performing the functions. A person skilled in the art should be easily aware that, in this disclosure, units and algorithm steps in the examples described with reference to the embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the requested functions for each particular application, but it should not be considered that the implementation goes beyond the scope of this disclosure.

In the embodiments of this disclosure, the information sharing network element and the mobility management network element may be divided into functional modules based on the foregoing method examples. For example, functional modules may be obtained through division in correspondence to functions, or two or more functions may be integrated into one processing module. The integrated module may be implemented in a form of hardware, or may be implemented in a form of a software functional module. It should be noted that, in this embodiment of this disclosure, module division is an example, and is merely a logical function division. During actual implementation, another division manner may be used.

Figure 10:
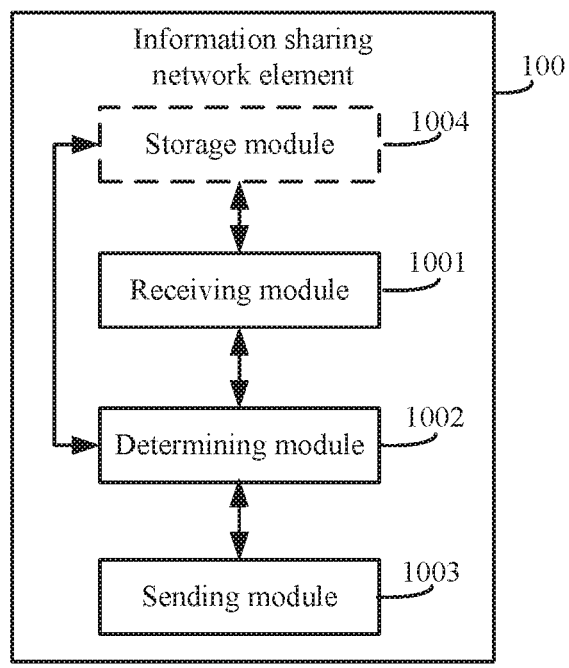
FIG. 10 is a schematic structural diagram of an information sharing network element according to an embodiment of this disclosure.

For example, when functional modules are obtained through division in correspondence to functions, FIG. 10 is a possible schematic structural diagram of an information sharing network element 100 in the foregoing embodiments. The information sharing network element 100 includes a receiving module 1001, a determining module 1002, and a sending module 1003.

The receiving module 1001 is configured to receive a monitoring request from a content server, where the monitoring request includes monitoring information of a terminal. The determining module 1002 is configured to: when the terminal is handed over between a first network and a second network, determine that a handed-over-to network supports the monitoring information. The sending module 1003 is configured to send the monitoring information to a mobility management network element in the handed-over-to network. The monitoring information is monitoring information of the terminal in a handed-over-from network.

Optionally, as shown in FIG. 10, the information sharing network element 100 includes a storage module 1004. The storage module 1004 is configured to store the monitoring information. Further, the storage module 1004 is specifically configured to store the monitoring information after it is determined, based on identification information of the terminal, that the terminal subscribes to the handed-over-to network and the terminal can be handed over between the first network and the second network.

Optionally, the first network is an unlicensed spectrum network, and the second network is a 3GPP network.

Further, the monitoring information includes a monitoring type. The determining module 1002 is specifically configured to: when the terminal is handed over from the first network to the second network, receive monitoring type indication information of the second network, and determine, based on the monitoring type indication information of the second network, that the handed-over-to network supports the monitoring type. Alternatively, the monitoring information includes a monitoring type. The determining module 1002 is specifically configured to: when the terminal is handed over from the second network to the first network, determine that the first network is capable of monitoring; receive monitoring type indication information of the first network from a mobility management network element in the first network; and determine, based on the monitoring type indication information of the first network, that the handed-over-to network supports the monitoring type.

Optionally, the determining module 1002 is further specifically configured to: receive monitoring capability indication information of the first network from the mobility management network element in the first network, and determine, based on the monitoring capability indication information, that the first network is capable of monitoring; or receive identification information of the first network from the mobility management network element in the first network, and determine, based on the identification information, that the first network is capable of monitoring.

All related content of the steps in the foregoing method embodiments may be cited in function descriptions of corresponding functional modules. Details are not described herein again.

Figure 11:
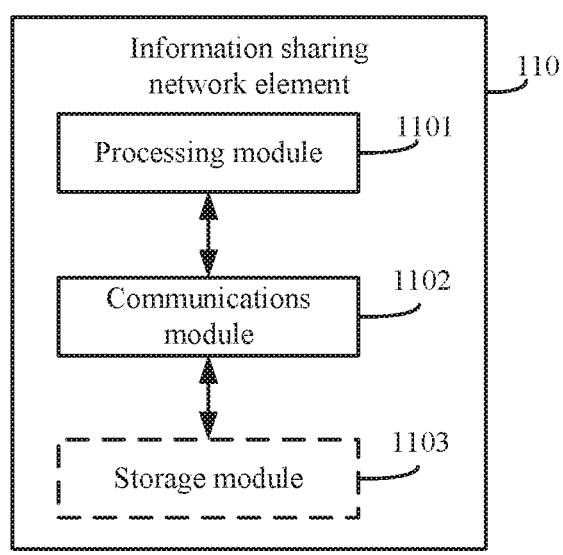
FIG. 11 is a schematic structural diagram of another information sharing network element according to an embodiment of this disclosure.

When functional modules are obtained through division in an integration manner. FIG. 11 is a possible schematic structural diagram of an information sharing network element 110 in the foregoing embodiments. As shown in FIG. 11, the information sharing network element 110 includes a processing module 1101 and a communications module 1102. Optionally, the information sharing network element 110 includes a storage module 1103. The processing module 1101 is configured to perform actions of the determining module 1002 in FIG. 10. The communications module 1102 is configured to perform actions of the receiving module 1001 and the sending module 1003 in FIG. 10. The storage module 1103 is configured to perform actions of the storage module 1004 in FIG. 10. For details, refer to the embodiment shown in FIG. 10, and details are not described herein again.

All related content of the steps in the foregoing method embodiments may be cited in function descriptions of corresponding functional modules. Details are not described herein again.

In the embodiments of this disclosure, the information sharing network element is presented in a form in which functional modules are obtained through division in correspondence to functions, or the information sharing network element is presented in a form in which functional modules are obtained through division in an integration manner. The "module" herein may be an application-specific integrated circuit (ASIC), a circuit, a processor that executes one or more software or firmware programs, a memory, an integrated logic circuit, and/or another component that can provide the foregoing functions. In a simple embodiment, a person skilled in the art can figure out that a form shown in FIG. 4 may be used for the information sharing network element 100 or the information sharing network element 110. For example, the receiving module 1001, the determining module 1002, the sending module 1003, and the storage module 1004 in FIG. 10 may be implemented by the processor 401 and the memory 403 in FIG. 4. Specifically, the receiving module 1001, the determining module 1002, the sending module 1003, and the storage module 1004 may be implemented by the processor 401 by invoking the application program code stored in the memory 403. This is not limited in the embodiment of this disclosure. Alternatively, for example, the processing module 1101, the communications module 1102, and the storage module 1103 in FIG. 11 may be implemented by the processor 401 and the memory 403 in FIG. 4. Specifically, the processing module 1101, the communications module 1102, and the storage module 1103 may be implemented by the processor 401 by invoking the application program code stored in the memory 403. This is not limited in the embodiment of this disclosure.

The information sharing network element provided in the embodiments of this disclosure may be configured to perform the foregoing terminal monitoring information synchronization method. Therefore, for technical effects that can be achieved by the information sharing network element, refer to the foregoing method embodiments. Details are not described herein again in the embodiments of this disclosure.

Figure 12:
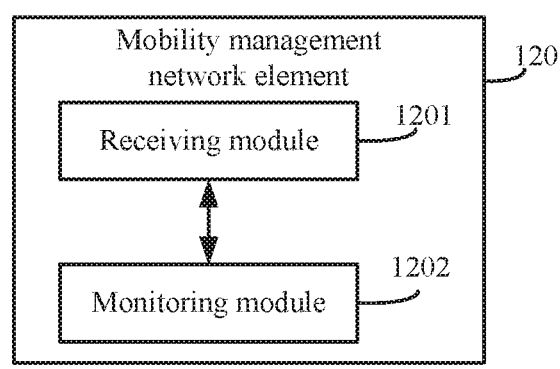
FIG. 12 is a schematic structural diagram of a mobility management network element according to an embodiment of this disclosure.

For example, when functional modules are obtained through division in correspondence to functions, FIG. 12 is a possible schematic structural diagram of a mobility management network element 120 in the foregoing embodiments. The mobility management network element 120 includes a receiving module 1201 and a monitoring module 1202.

The receiving module 1201 is configured to: when a terminal is handed over between a first network and a second network, receive monitoring information of the terminal in a handed-over-from network from an information sharing network element. The monitoring module 1202 is configured to monitor the terminal based on the monitoring information.

All related content of the steps in the foregoing method embodiments may be cited in function descriptions of corresponding functional modules. Details are not described herein again.

Figure 13:
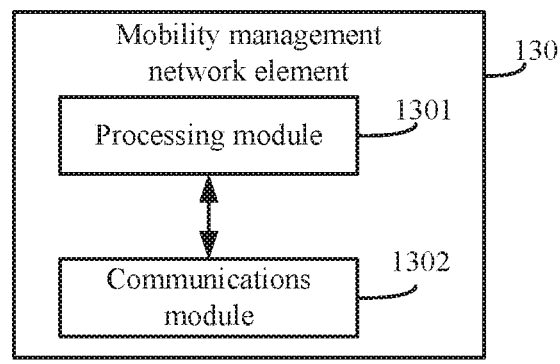
FIG. 13 is a schematic structural diagram of another mobility management network element according to an embodiment of this disclosure.

When functional modules are obtained through division in an integration manner, FIG. 13 is a possible schematic structural diagram of a mobility management network element 130 in the foregoing embodiments. As shown in FIG. 13, the mobility management network element 130 includes a processing module 1301 and a communications module 1302. The processing module 1301 is configured to perform actions of the monitoring module 1202 in FIG. 12. The communications module 1302 is configured to perform actions of the receiving module 1201 in FIG. 12. For details, refer to the embodiment shown in FIG. 12, and details are not described herein again.

All related content of the steps in the foregoing method embodiments may be cited in function descriptions of corresponding functional modules. Details are not described herein again.

In the embodiments of this disclosure, the mobility management network element is presented in a form in which functional modules are obtained through division in correspondence to functions, or the mobility management network element is presented in a form in which functional modules are obtained through division in an integration manner. The "module" herein may be an application-specific integrated circuit (ASIC), a circuit, a processor that executes one or more software or firmware programs, a memory, an integrated logic circuit, and/or another component that can provide the foregoing functions. In a simple embodiment, a person skilled in the art can figure out that a form shown in FIG. 4 may be used for the mobility management network element 120 or the mobility management network element 130. For example, the receiving module 1201 and the monitoring module 1202 in FIG. 12 may be implemented by the processor 401 and the memory 403 in FIG. 4. Specifically, the receiving module 1201 and the monitoring module 1202 may be implemented by the processor 401 by invoking the application program code stored in the memory 403. This is not limited in the embodiment of this disclosure. Alternatively, for example, the processing module 1301 and the communications module 1302 in FIG. 13 may be implemented by the processor 401 and the memory 403 in FIG. 4. Specifically, the processing module 1301 and the communications module 1302 may be implemented by the processor 401 by invoking the application program code stored in the memory 403. This is not limited in the embodiment of this disclosure.

The mobility management network element provided in the embodiments of this disclosure may be configured to perform the foregoing terminal monitoring information synchronization method. Therefore, for technical effects that can be achieved by the mobility management network element, refer to the foregoing method embodiments. Details are not described herein again in the embodiments of this disclosure.

All or some of the foregoing embodiments may be implemented by using software, hardware, firmware, or any combination thereof. When a software program is used for implementation, the embodiments may be implemented completely or partially in a form of a computer program product. The computer program product includes one or more computer instructions. When the computer program instructions are loaded and executed on a computer, the procedures or functions according to the embodiments of this disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by the computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this disclosure is described with reference to the embodiments, in a process of implementing this disclosure that claims protection, a person skilled in the art can understand and implement other variations of the disclosed embodiments by viewing the accompanying drawings, disclosed content, and the appended claims. In the claims, "comprising" does not exclude another component or step, and "a" or "one" does not exclude a case of plurality. A single processor or another unit may implement functions enumerated in the claims. Some measures are recorded in dependent claims that are different from each other, but this does not mean that these measures cannot be combined to produce an advantageous effect.

Although this disclosure is described with reference to specific features and the embodiments thereof, obviously, various modifications and combinations may be made to this disclosure without departing from the scope of this disclosure. Correspondingly, this specification and the accompanying drawings are merely example descriptions of this disclosure defined by the appended claims, and are considered as covering any or all of modifications, variations, combinations, or equivalents within the scope of this disclosure. Obviously, a person skilled in the art may make various modifications and variations to this disclosure without departing from the scope of this disclosure. This disclosure is intended to cover these modifications and variations of this disclosure provided that these modifications and variations fall within the scope of the claims of this disclosure and equivalent technologies thereof.

What is claimed is:

1. A method, comprising:
   processing, by an information sharing network element executed by a processor, a monitoring request received from a content server to determine whether a handed-over-to network supports monitoring information included in the monitoring request, the monitoring information being associated with a terminal that is in one of a first network or a second network and is handed over to the other of the first network or the second network; and
   sending, by the information sharing network element, the monitoring information to a mobility management network element in a handed-over-to network based on a determination that the handed-over-to network supports the monitoring information,
   wherein the monitoring information comprises data indicative of an operating status of the terminal in a handed-over-from network, and wherein the monitoring information comprises a monitoring type, and the information sharing network element determines that the handed-over-to network supports the monitoring information and that the handed-over-to network is capable of monitoring based on monitoring type indication information of the handed-over-to network received from the mobility management network element.

2. The method according to claim 1, further comprising: causing, by the information sharing network element, the monitoring information to be stored in a memory.

3. The method according to claim 1, wherein the monitoring request comprises identification information of the terminal, and the method further comprises:
determining, by the information sharing network element based on the identification information of the terminal, that the terminal subscribes to the handed-over-to network.

4. The method according to claim 1, wherein the first network is an unlicensed spectrum network, and the second network is a 3rd generation partnership project (3GPP) network.

5. The method according to claim 1, wherein the information sharing network element determines that the handed-over-to network is capable of monitoring based on capability indication information of the handed-over-to network received from the mobility management network element or identification information of the handed-over-to network received from the mobility management network element.

6. The method according to claim 1, wherein the information sharing network element comprises a home subscriber server (HSS), a service capability exposure function (SCEF) network element, or an authentication, authorization and accounting server (AAA) server.

7. The method according to claim 1, wherein the monitoring information further comprises a monitoring duration and/or a maximum report quantity.

8. An apparatus, comprising:
at least one processor coupled with a memory, the memory having computer readable instructions stored thereon that when executed by the at least one processor cause the apparatus to:
process a monitoring request received from a content server to determine whether a handed-over-to network supports monitoring information included in the monitoring request, the monitoring information being associated with a terminal that is in one of a first network or a second network and is handed over to the other of the first network or the second network; and
send the monitoring information to a mobility management network element in a handed-over-to network based on a determination that the handed-over-to network supports the monitoring information,
wherein the monitoring information comprises data indicative of an operating status of the terminal in a handed-over-from network, and
wherein the monitoring information comprises a monitoring type, and the apparatus is further caused to:
determine that the handed-over-to network supports the monitoring information and that the handed-over-to network is capable of monitoring based on monitoring type indication information of the handed-over-to network received from the mobility management network element.

9. The apparatus according to claim 8, wherein the apparatus is further caused to:
store the monitoring information.

10. The apparatus according to claim 8, wherein the monitoring request comprises identification information of the terminal, and the apparatus is further caused to:
determine, based on the identification information of the terminal, that the terminal subscribes to the handed-over-to network.

11. The apparatus according to claim 8, wherein the first network is an unlicensed spectrum network, and the second network is a 3rd generation partnership project (3GPP) network.

12. The apparatus according to claim 8, wherein the apparatus is further caused to:
determine that the handed-over-to network is capable of monitoring based on capability indication information of the handed-over-to network received from the mobility management network element or identification information of the handed-over-to network received from the mobility management network element.

13. The apparatus according to claim 8, wherein the apparatus is further caused to implement an information sharing network element that comprises a home subscriber server (HSS), a service capability exposure function (SCEF) network element, or an authentication, authorization and accounting server (AAA) server.

14. The apparatus according to claim 8, wherein the monitoring information further comprises a monitoring duration and/or a maximum report quantity.

15. A non-transitory computer-readable storage medium having computer-readable instructions stored thereon that, when executed by a processor, cause an apparatus to:
process a monitoring request received from a content server to determine whether a handed-over-to network supports monitoring information included in the monitoring request, the monitoring information being associated with a terminal that is in one of a first network or a second network and is handed over to the other of the first network or the second network; and
send the monitoring information to a mobility management network element in a handed-over-to network based on a determination that the handed-over-to network supports the monitoring information,
wherein the monitoring information comprises data indicative of an operating status of the terminal in a handed-over-from network, and
wherein the monitoring information comprises a monitoring type, and the apparatus is further caused to:
determine that the handed-over-to network supports the monitoring information and that the handed-over-to network is capable of monitoring based on monitoring type indication information of the handed-over-to network received from the mobility management network element.

16. The non-transitory computer-readable storage medium according to claim 15, wherein the apparatus is further caused to:
store the monitoring information in a memory.

* * * * *